(12) United States Patent
Sasaki et al.

(10) Patent No.: US 8,067,866 B2
(45) Date of Patent: Nov. 29, 2011

(54) CENTRAL ELECTRICITY DISTRIBUTION MEMBER FOR ROTARY ELECTRIC MACHINE

(75) Inventors: Kei Sasaki, Nagoya (JP); Masaki Okamoto, Yokkaichi (JP)

(73) Assignees: Toyota Jidosha Kabushiki Kaisha, Toyota-shi (JP); Sumimoto Wiring Systems, Ltd, Yokkaichi-shi (JP)

( * ) Notice: Subject to any disclaimer, the term of this patent is extended or adjusted under 35 U.S.C. 154(b) by 191 days.

(21) Appl. No.: 12/331,030

(22) Filed: Dec. 9, 2008

(65) Prior Publication Data

US 2009/0152975 A1    Jun. 18, 2009

(30) Foreign Application Priority Data

Dec. 12, 2007   (JP) ................. 2007-320637

(51) Int. Cl.
  *H02K 11/00* (2006.01)
(52) U.S. Cl. .......... 310/71; 310/179; 310/180
(58) Field of Classification Search ............ 310/71, 310/179, 180
  See application file for complete search history.

(56) References Cited

U.S. PATENT DOCUMENTS

| | | | | |
|---|---|---|---|---|
| 6,945,817 B2* | 9/2005 | Miyazaki et al. | ............ | 439/579 |
| 2002/0084713 A1* | 7/2002 | Kuroyanagi | .................. | 310/180 |
| 2004/0229508 A1* | 11/2004 | Miyazaki et al. | ............ | 439/607 |
| 2006/0208583 A1* | 9/2006 | Ueno et al. | .................... | 310/71 |
| 2007/0076354 A1* | 4/2007 | Kato et al. | ................... | 361/637 |

FOREIGN PATENT DOCUMENTS

| | | | |
|---|---|---|---|
| JP | 2000-224801 A | | 8/2000 |
| JP | 2003-134724 A | | 5/2003 |
| JP | 2004194367 A | * | 7/2004 |
| JP | 2005304278 A | * | 10/2005 |
| JP | 2006-246594 A | | 9/2006 |
| JP | 2006-333684 A | | 12/2006 |
| JP | 2007-014083 A | | 1/2007 |
| JP | 2007-104812 A | | 4/2007 |
| JP | 2007-267525 A | | 10/2007 |

OTHER PUBLICATIONS

Machine translation of JP 2007267525 A.*
Machine translation of JP 2007267525 A (foreign document published: 2007).*

* cited by examiner

*Primary Examiner* — Quyen Leung
*Assistant Examiner* — Alex W Mok
(74) *Attorney, Agent, or Firm* — Kenyon & Kenyon LLP

(57) ABSTRACT

A central electricity distribution member for a rotary electric machine, comprising connecting bus bars of respective phases for connecting, among coils of respective phases wound around a stator of the rotary electric machine, the coils of the same phases; a connecting bus bar for a neutral point for connecting the coils of the same phases wound around the stator of the rotary electric machine; a circular holding groove capable of receiving the respective connecting bus bars as the respective connection bus bars are insulated from one another; a bus bar insulating portion formed using insulating material; a bus bar-side positioning portion provided on each of the connecting bus bars; and an insulation-side positioning portion provided on the bus bar insulating portion, for performing positioning between the respective connecting bus bars and the bus bar insulating portion in cooperation with the bus bar-side positioning portion.

3 Claims, 5 Drawing Sheets

CENTRAL ELECTRICITY DISTRIBUTION MEMBER FOR ROTARY ELECTRIC MACHINE

PRIORITY INFORMATION

This application claims priority to Japanese Patent Application No. 2007-320637 filed on Dec. 12, 2007, which is incorporated herein by reference in its entirety.

BACKGROUND OF THE INVENTION

1. Field of the Invention

The present invention relates to a central electricity distribution member for a rotary electric machine, and in particular to a central electricity distribution member for a rotary electric machine having bus bars of respective phases.

2. Description of the Related Art

A rotary electric machine having bus bars of respective phases requires insulation among the respective bus bars. For example, Patent Document 1 describes a central electricity distribution member having a plurality of bus bars corresponding to respective phases of a motor, and a continuous circular plastic insulating holder, in which three holding grooves are formed on one side surface of the insulating holder so as to be recessed and to extend along the circumferential direction of the insulating holder, with the bus bars corresponding to the respective phases individually inserted into the respective holding grooves, and the insulating holder and respective bus bars are entirely covered by an insulating resin layer.

Patent Document 1: Japanese Patent Laid-open Publication No. 2003-134724

Use of the structure described in the above-described Patent Document 1 enables insulation among the bus bars of the respective phases. However, although the structure of the Patent Document 1 can realize insulation among the bus bars of the respective phases, the structure may suffer from poor matching in assembly due to lack of position regulation for the respective bus bars and bus bar insulating portion, or an insulating holder.

SUMMARY OF THE INVENTION

According to one aspect of the present invention, there is provided a central electricity distribution member for a rotary electric machine, comprising connecting bus bars of respective phases for connecting, among coils of respective phases wound around a stator of the rotary electric machine, the coils of the same phases; a bus bar for a neutral point for connecting the coils of the same phases wound around the stator of the rotary electric machine; a bus bar insulating portion having a circular holding groove for accepting a respective bus bar and insulating the respective bus bars from one another; an insulation-side positioning portion provided on the bus bar insulating portion; and a bus bar-side positioning portion provided on each of the bus bars, for performing positioning between the bus bar insulating portion and the respective bus bars in cooperation with the insulation-side positioning portion.

Also, in the central electricity distribution member for a rotary electric machine, preferably, the insulation-side positioning portion may be one of the inside walls opposed to a groove width direction of the holding groove, the one inside wall having at least a part thereof inclined such that the groove width of the holding groove becomes smaller from an opening side to a bottom surface side of the holding groove, and the bus bar-side positioning portion may be a convex portion for abutting on the inclined wall.

Also, in the central electricity distribution member for a rotary electric machine, preferably, the insulation-side positioning portion may be a convex portion which once protrudes on a bottom surface of the holding grove along a longitudinal direction of the holding groove and then returns to an original level thereof, and a bus bar-side positioning portion may be a concave portion for accepting a convex portion of the holding groove, the convex portion being formed on the bottom surface of the holding groove.

Also, preferably, the central electricity distribution member for a rotary electric machine may further comprise a pressing cover portion for pressing the respective bus bars in a depth direction of the holding groove, wherein the bus bar insulating portion may have an insulation-side engagement portion formed on at least one of outside walls thereof on a radially inward side and on a radially outward side, and the pressing cover portion may have a cover-side engagement portion for causing the pressing cover portion to be engaged with the bus bar insulating portion in cooperation with the insulation-side engagement portion.

ADVANTAGE OF THE INVENTION

According to at least one of the above-described structures, the central electricity distribution member for a rotary electric machine comprises an insulation-side positioning portion provided on the bus bar insulating portion and a bus bar-side positioning portion provided on each of the bus bars for performing positioning between the bus bar insulating portion and the respective bus bars in cooperation with the insulation-side positioning portion. Therefore, positioning can be attained between the respective bus bars and bus bar insulating portion.

According to at least one of the above-described structures, in the central electricity distribution member for a rotary electric machine, the insulation side positioning portion is one of the inside walls opposed to the groove width direction of the holding groove, the one inside wall having at least a part thereof inclined such that the groove width of the holding groove becomes smaller from the opening side to the bottom surface side of the holding groove, and the bus bar-side positioning portion is a convex portion for abutting on the inclined wall. Therefore, positioning can be attained in the groove width direction of the holding groove between the respective bus bars and the bus bar insulating portion.

According to at least one of the above-described structures, the insulation side positioning portion is a convex portion which once protrudes on the bottom surface of the holding grove along the longitudinal direction of the holding groove and then returns to its original level, and the bus bar-side positioning portion is a concave portion for accepting the convex portion of the holding groove, the convex portion being formed on the bottom surface of the holding groove. Therefore, positioning can be attained in the longitudinal direction of the holding groove between the respective bus bars and bus bar insulating portion.

According to at least one of the above-described structures, the central electricity distribution member for a rotary electric machine further comprises a pressing cover portion for pressing the respective bus bars in the depth direction of the holding groove, wherein the bus bar insulating portion has an insulation-side engagement portion formed on at least one of the outside walls on the radially inward and outward sides, and the pressing cover portion has a cover-side engagement portion for causing the pressing cover portion to be engaged with the bus bar insulating portion in cooperation with the insulation-side engagement portion. Therefore, positioning can be attained in the depth direction of the holding groove between the respective bus bars and the bus bar insulating portion.

DESCRIPTION OF THE PREFERRED EMBODIMENTS

In the following, an embodiment of the present invention will be described in detail with reference to the accompanying drawings. Note that although a concentrated winding will be described as a method for winding a coil of a rotary electric machine, a distributed winding will be similarly applicable.

Figure 1:
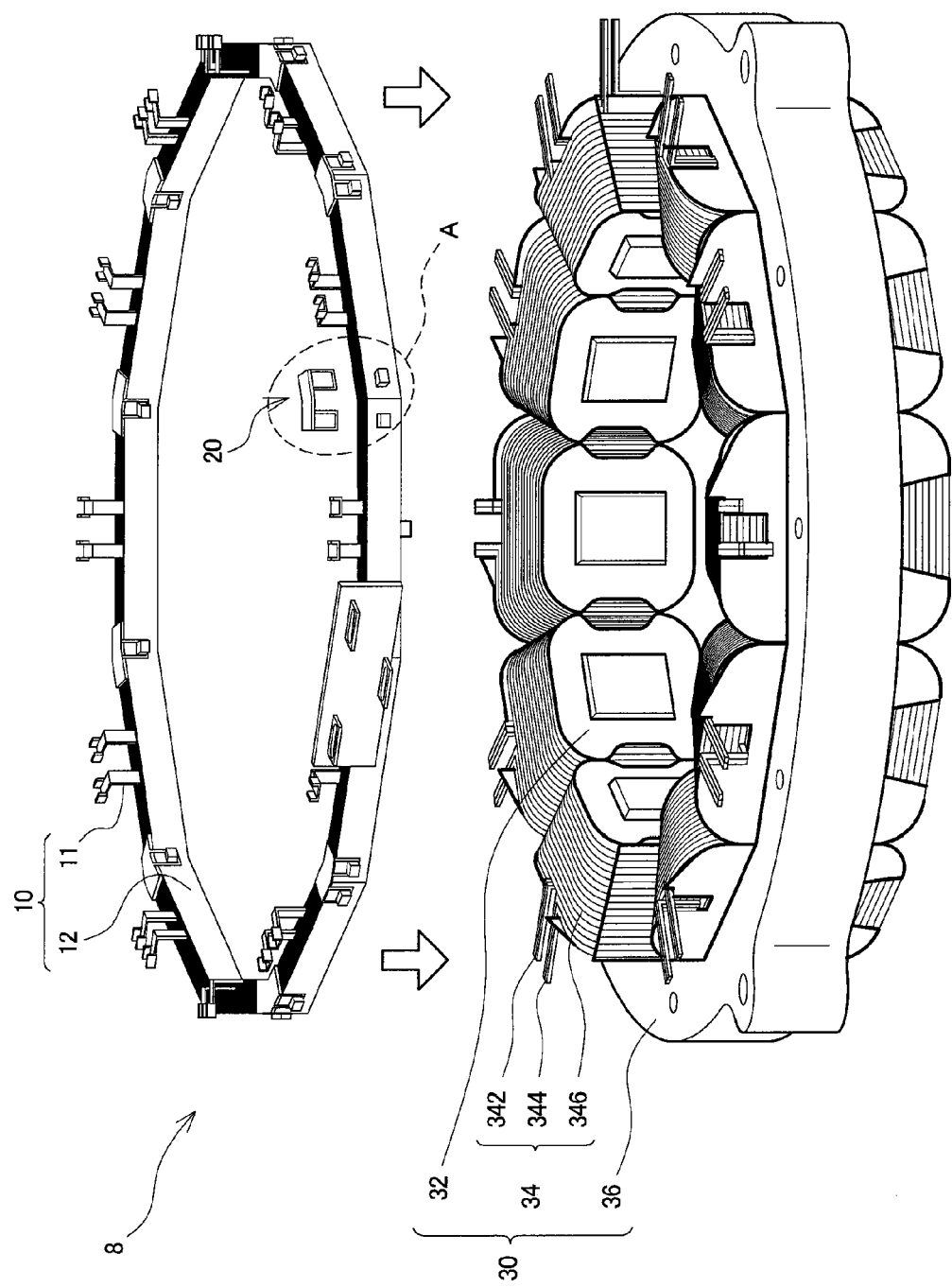
FIG. 1 is a diagram showing a state in which a central electricity distribution member according to an embodiment of the present invention is mounted on the stator of a rotary electric machine.
Figure 2:
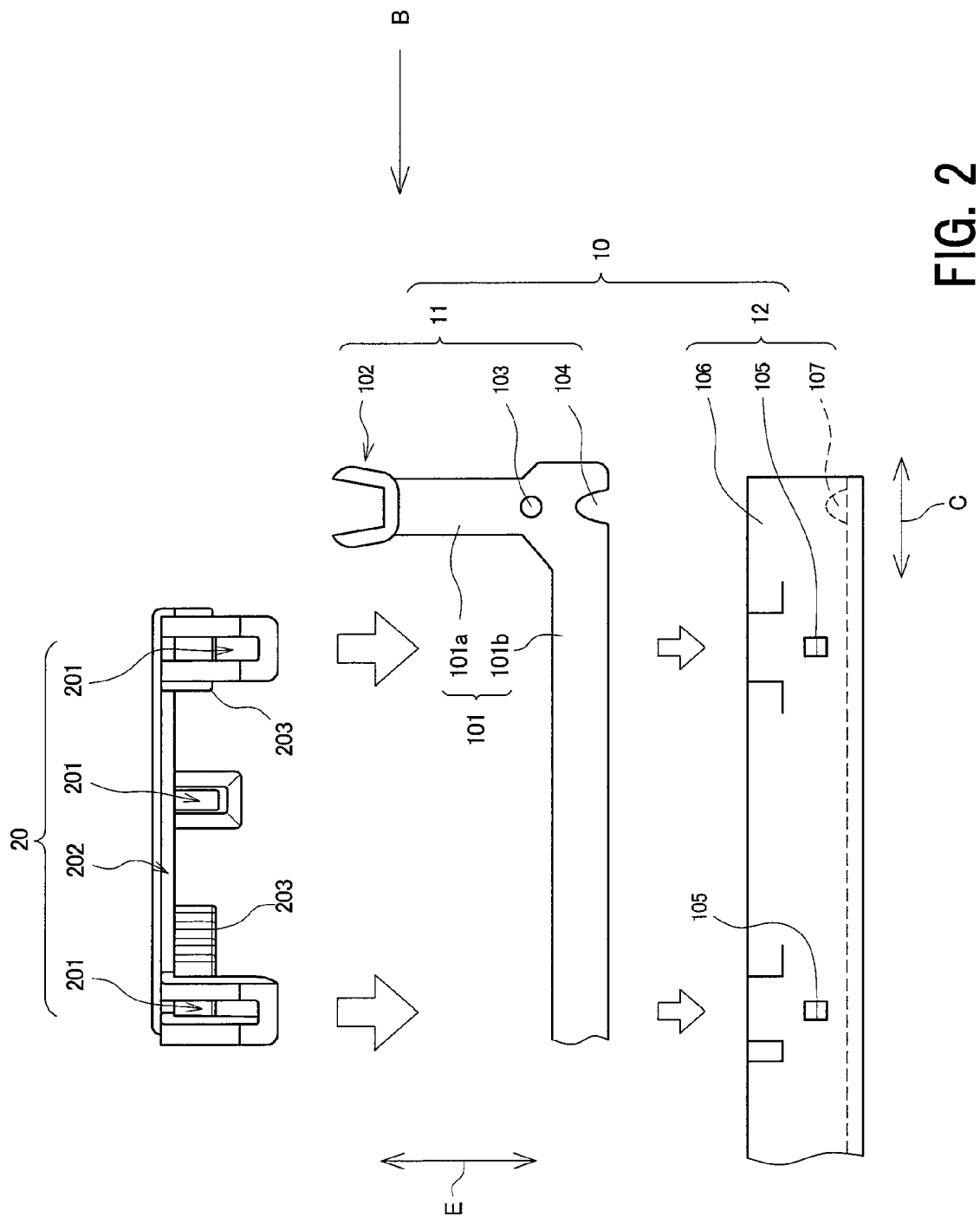
FIG. 2 is an enlarged view showing a portion enclosed by the broken line A in FIG. 1, specifically showing a connecting bus bar, a bus bar insulating portion, and a central electricity distribution member cover portion in such a manner that these are separated from one another.
Figure 3:
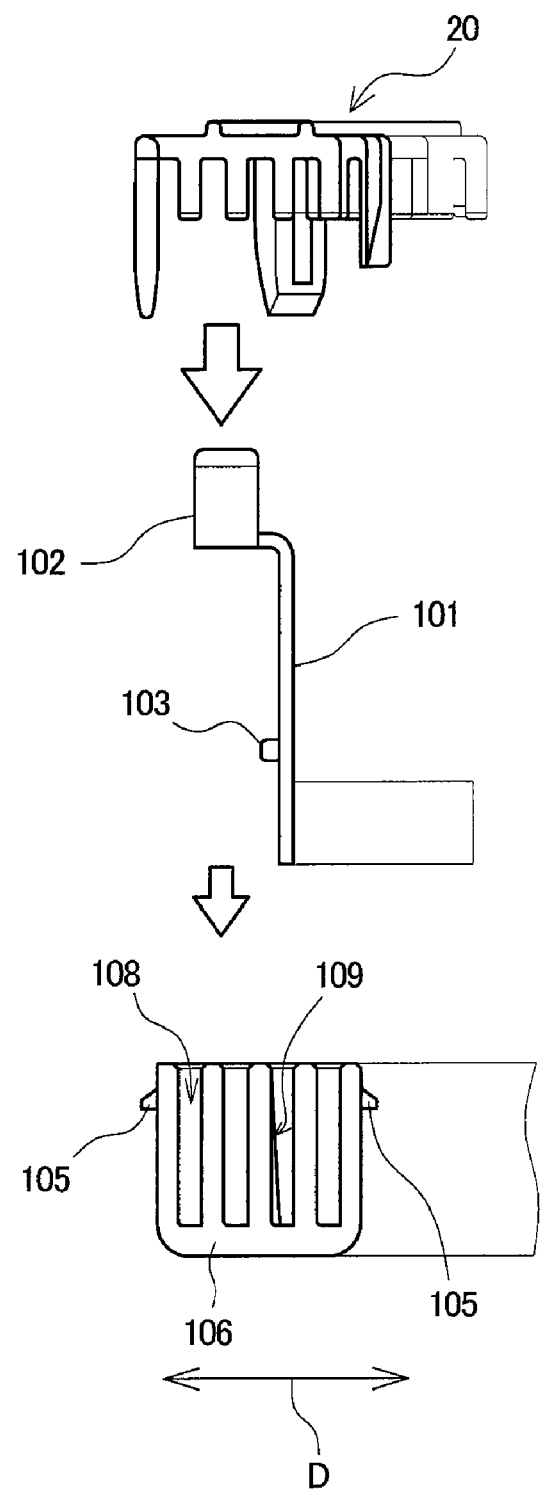
FIG. 3 is a diagram corresponding to FIG. 2, as viewed from the direction indicated by the arrow B.

FIG. 1 is a diagram showing a state in which a central electricity distribution member 8 is mounted on a stator 30 of a rotary electric machine. FIG. 2 is an enlarged view showing a portion enclosed by the broken line A in FIG. 1, specifically showing a connecting bus bar 11, a bus bar insulating portion 12, and a central electricity distribution member cover portion 20 in such a manner that these are separated from one another. FIG. 3 is a diagram corresponding to FIG. 2, as viewed from the direction indicated by arrow B.

The stator 30 comprises a stator yoke 36, teeth 32 extending from the stator yoke 36 in the radially inward direction, and a coil 34 wound around each tooth 32. The coil 34 is a winding wound around the tooth 32 in the concentrated winding manner. The coil 34 comprises a winding coil portion 346 wound around the tooth 32 and end portions thereof, including one end 344 and the other end 342, both extending in the radially outward direction of the stator 30.

The central electricity distribution member 8 is a member for connecting coils 34 of the same phases or constituting a neutral point in the rotary electric machine and ensuring insulation among coils of different phases. The central electricity distribution member 8 comprises a main central electricity distribution member portion 10 and a central electricity distribution member cover portion 20.

The main central electricity distribution member portion 10 comprises a plurality of connecting bus bars 11 and a bus bar insulating portion 12. The plurality of connecting bus bars 11 are provided, in the case of a three-phase rotary electric machine, respectively for U-phase, V-phase, W-phase, and a neutral point. Also, four holding grooves 108 for U-phase, V-phase, W-phase, and a neutral point, respectively, are formed on the bus bar insulating portion 12.

The bus bar insulating portion 12 is a member having circular holding grooves 108, into which the plurality of connecting bus bars 11 can be respectively inserted as the bus bars 11 are insulated from one another. The bus bar insulating portion 12 comprises a main bus bar insulating portion 106, an insulation-side engagement portion 105, the holding grooves 108, a taper portion 109, and an insulation-side convex portion 107. Note that the bus bar insulating portion 12 may be formed from insulating material, such as plastic and the like, with the surface thereof coated by a sufficient insulating film.

The main bus bar insulating portion 106 is a circular insulating member. The holding groove 108 is a groove deep enough for a respective bus bar of U-phase, V-phase, W-phase, and a neutral point to be mounted therein, and is formed circular on the bus bar insulating portion 12. Also, the holding groove 108 is a groove, with a respective bus bar mounted therein, for insulating the respective bus bars from one another.

The insulation-side convex portion 107 is a convex portion formed on a part of the bottom surface of the bus bar insulating portion 12, the bottom surface constituting the holding groove 108. Note that the insulation-side convex portion 107 is a convex portion having a shape protruding once along the longitudinal direction of the holding groove 108 and then returning to the original level thereof. Also, the insulation-side convex portion 107 is provided along the circumferential direction on the bottom surface of the holding groove 108 at a predetermined interval.

The taper portion 109 refers to one of the inside walls opposed to the groove width direction of the holding groove 108 of the bus bar insulating portion 12, the one inside wall having at least a part thereof inclined such that the groove width of the holding groove 108 becomes smaller from the opening side to the bottom surface side of the holding groove 108.

The insulation-side engagement portion 105 refers to a portion projecting from the radially inward-side outer wall constituting the bus bar insulating portion 12 in the radially inward direction and a portion projecting from the radially outward-side outer wall constituting the same in the radially outward direction. The insulation-side engagement portion 105 is provided at a predetermined interval along the circumferential direction of the bus bar insulating portion 12.

The connecting bus bar 11 has a function for connecting the same or different phase coils of the three-phase coils of the rotary electric machine thereby constituting a neutral point. The connecting bus bar 11 comprises a main bus bar portion 101, a bus bar terminal portion 102, a bus bar-side convex portion 103, and a bus bar-side concave portion 104. The connecting bus bar 11 is formed by processing an electric conductive metal plate into a desired flat shape and then bending.

The main bus bar portion 101 comprises an arc portion 101b bent into an arc shape so as to follow the ring-shape of the stator 30, and an extending portion 101a extending in the axial direction of the stator 30.

The bus bar terminal portion 102 is a connection portion bent into a U-shape and provided on the tip end of the extending portion 101a. With the central electricity distribution member 8 mounted on the stator 30, the bus bar terminal portion 102 is connected to either one of the one end 344 and the other end 342 of the coil 34. With all of the bus bar terminal portions 102 of the connecting bus bars 11, provided along the circumferential direction of the holding groove 108, so connected, coils of the same phase or neutral points of the coils of respective phases among the three-phase coils of the rotary electric machine are resultantly electrically connected to one another.

The bus bar-side convex portion 103 is a convex portion formed on the main bus bar portion 101. The bus bar-side convex portion 103 is provided in a position which, with the connecting bus bar 11 inserted, makes the bus bar-side convex portion 103 abut on the taper portion 109 of the bus bar insulating portion 12 on the opening side of the holding groove 108, having a function for performing positioning in the diameter direction (the direction indicated by arrow D in FIG. 3) in cooperation with the taper portion 109.

The bus bar-side concave portion 104 is a concave portion provided on the main bus bar portion 101. The bus bar-side concave portion 104 is a concave portion into which the insulation-side convex portion 107 formed on the holding groove 108 is fit, having a function for performing positioning in the circumferential direction (the direction indicated by arrow C in FIG. 2) in cooperation with the insulation-side convex portion 107.

The central electricity distribution member cover portion 20 comprises a main cover portion 202 and cover-side engagement portions 201. The central electricity distribution member cover portion 20 has a function for pressing the connecting bus bar 11, when inserted into the bus bar insulating portion 12, in the axial direction (the direction indicated by arrow E in FIG. 2) in cooperation with the bus bar insulating portion 12.

The main cover portion 202 is an insulating member whose width is substantially identical to that, in the diameter direction, of the bus bar insulating portion 12.

The cover-side engagement portions 201 are members extending from the main cover portion 202 in the depth direction of the holding groove 108. The cover-side engagement portions 201 are provided corresponding to the respective engagement portions 105 formed on the bus bar insulating portions 12 on the radially inward and outward sides. The cover-side engagement portion 201 has a groove having the size for accepting the projection of the insulation-side engagement portion 105, and causes, in cooperation with the insulation-side engagement portion 105, the central electricity distribution member cover portion 20 to be engaged with the bus bar insulating portion 12.

Cover-side pressing-portions 203 are members extending from the main cover portion 202 in the depth direction of the holding groove 108. The cover-side pressing-portions 203 have a function for pressing, from above, the connecting bus bars 11, when inserted, toward the bottom surfaces of the respective holding grooves 108.

Figure 4:
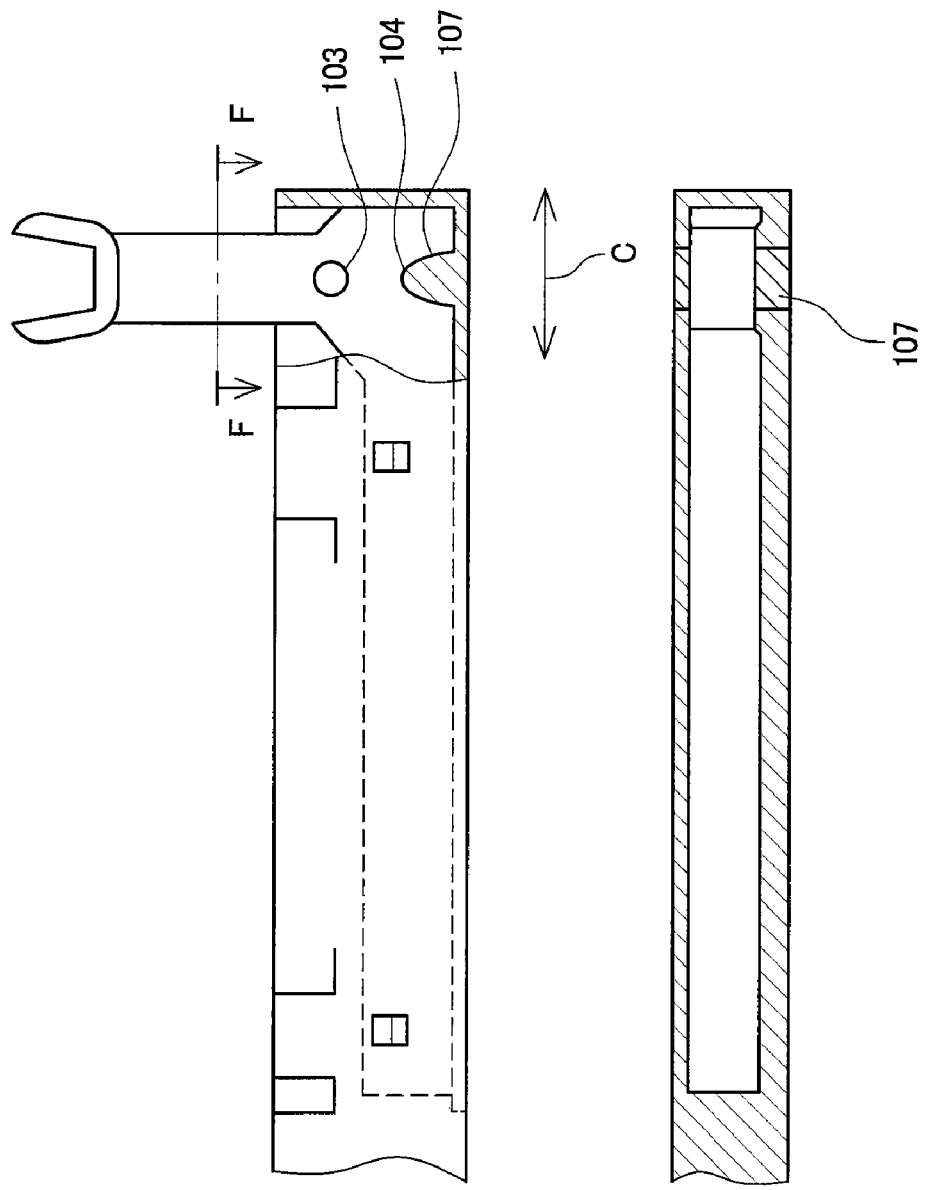
FIG. 4 is a diagram showing a state in which, in FIG. 2, the connecting bus bar is inserted into the bus bar insulating portion.
Figure 5:
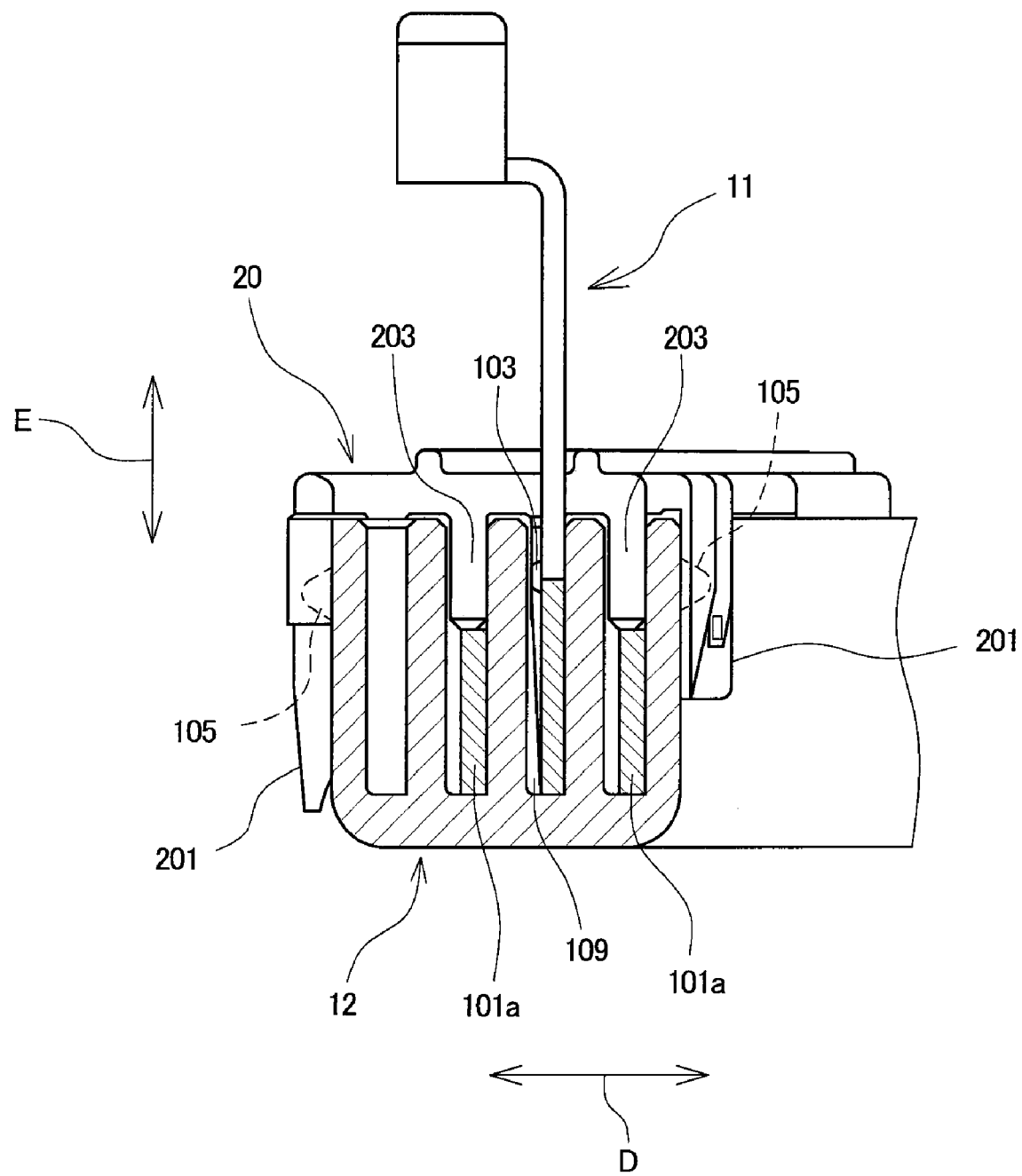
FIG. 5 is a diagram showing a state in which, in FIG. 3, after the connecting bus bar is inserted into the bus bar insulating portion, the central electricity distribution member cover portion is mounted.

Operation of the above-described structure will now be described. FIG. 4 is a diagram showing a state in which, in FIG. 2, the connecting bus bar 11 is inserted into the bus bar insulating portion 12. FIG. 5 is a diagram showing a state in which, in FIG. 3, after the connecting bus bar 11 is inserted into the bus bar insulating portion 12, the central electricity distribution member cover portion 20 is mounted. Note that elements identical with those shown in FIGS. 1 and 2 are assigned identical reference numerals, and descriptions thereof are not repeated.

FIG. 4 shows a state in which the connecting bus bar 11 is inserted into the holding groove 108 of the bus bar insulating portion 12. The insulation-side convex portion 107 is fitted into the bus bar-side concave portion 104 of the connecting bus bar 11. Note that because the insulation-side convex portion 107 is a convex portion which once protrudes along the longitudinal direction of the holding groove 108 and then returns to its original level, the respective connecting bus bars will not be displaced in the circumferential direction of the bus bar insulating portion 12. Therefore, positioning can be attained in the circumferential direction of the holding groove 108 between the respective connecting bus bars 11 and the bus bar insulating portion 12.

In FIG. 5, the taper portion 109 of the bus bar insulating portion 12 is a wall inclined such that the width of the holding groove 108 becomes smaller from the opening side toward the bottom surface side of the holding groove 108, and the bus bar-side convex portion 103 abuts on the taper portion 109 on the opening side of the holding groove 108. As described above, because the bus bar-side convex portion 103 abuts on the taper portion 109, the respective connecting bus bars 11 will not be displaced in the diameter direction of the bus bar insulating portion 12. Therefore, positioning can be attained in the diameter direction of the holding groove 108 between the respective connecting bus bar 11 and bus bar insulating portion 12.

In FIG. 5, the insulation-side engagement portion 105 of the bus bar insulating portion 12 is engaged with the cover-side engagement portion 201 of the central electricity distribution member cover portion 20, whereby the bus bar insulating portion 12 and the central electricity distribution member cover portion 20 are fixed. Note that because the cover-side pressing portions 203 of the central electricity distribution member cover portion 20 press, from above, the respective connecting bus bars 11, when inserted, toward the bottom surfaces of the respective holding grooves 108, the respective connecting bus bars 11 will not be displaced in the axial direction of the holding grooves 108 of the bus bar insulating portion 12. Therefore, positioning can be attained in the axial direction of the holding groove 108 between the respective connecting bus bars 11 and bus bar insulating portion 12.

What is claimed is:

1. A central electricity distribution member for a rotary electric machine, comprising: connecting bus bars of respective phases for connecting, among coils of respective phases wound around a stator of the rotary electric machine, the coils of the same phases; a bus bar for a neutral point for connecting the coils of the same phases wound around the stator of the rotary electric machine; a bus bar insulating portion having a circular holding groove for accepting a respective bus bar and insulating the respective bus bars from one another; an insulation-side positioning portion provided on the bus bar insulating portion; and a bus bar-side positioning portion provided on each of the bus bars, for performing positioning between the bus bar insulating portion and the respective bus bars in cooperation with the insulation-side positioning portion, wherein the insulation-side positioning portion is one of inside walls opposed to a groove width direction of the holding groove, the one inside wall having at least a lower part thereof, that is proximate a bottom surface of the holding groove, inclined such that the groove width of the holding groove becomes smaller from an opening side to the bottom surface of the holding groove, and the bus bar-side positioning portion is a curved portion for abutting on the inclined wall, and wherein the bus bar-side positioning portion is slidably engageable with a face of the lower part of the inclined inside wall so that the bus bar-side positioning portion moves in the width direction across the holding groove as it slides toward the bottom surface of the holding groove.

2. The central electricity distribution member for a rotary electric machine according to claim 1, wherein a curved portion once protrudes on a bottom surface of the holding groove along a longitudinal direction of the holding groove and then returns to an original level thereof, and a concave portion for accepting a convex portion of the holding groove, the convex portion being formed on the bottom surface of the holding groove.

3. The central electricity distribution member for a rotary electric machine according to claim 1, further comprising: a pressing cover portion for pressing the respective bus bars in a depth direction of the holding groove, wherein the bus bar insulating portion has an insulation-side engagement portion formed on at least one of outside walls thereof on a radially inward side and on a radially outward side, and the pressing cover portion has a cover-side engagement portion for causing the pressing cover portion to be engaged with the bus bar insulating portion in cooperation with the insulation-side engagement portion.

* * * * *